United States Patent [19]

Sweeney

[11] 3,913,401

[45] Oct. 21, 1975

[54] MOUNTING APPARATUS

[75] Inventor: William T. Sweeney, Ponca City, Okla.

[73] Assignee: Continental Oil Company, Ponca City, Okla.

[22] Filed: Mar. 25, 1974

[21] Appl. No.: 454,043

[52] U.S. Cl. .................................................. 73/299
[51] Int. Cl.² ........................................ G01F 23/02
[58] Field of Search ..................... 73/299, 324, 328; 116/118 R

[56] References Cited
UNITED STATES PATENTS

| | | |
|---|---|---|
| 1,410,469 | 3/1922 | Goranson ............................. 73/299 |
| 1,670,578 | 5/1928 | Joyce ................................... 73/299 |
| 3,141,333 | 7/1964 | Lester ................................... 73/299 |
| 3,257,851 | 6/1966 | Altman et al. ..................... 73/299 X |

Primary Examiner—Richard C. Queisser
Assistant Examiner—Joseph W. Roskos
Attorney, Agent, or Firm—F. Lindsey Scott

[57] ABSTRACT

A mounting apparatus for positioning a fluid level sensor on a fluid containing vessel wherein the mounting apparatus comprises a tubular member positioned in fluid communication with the vessel; a standpipe in fluid communication with the tubular member and a pressure damping means; and, a fluid level and pressure sensing device in fluid communication with the tubular member.

8 Claims, 3 Drawing Figures

U.S. Patent  Oct. 21, 1975  3,913,401
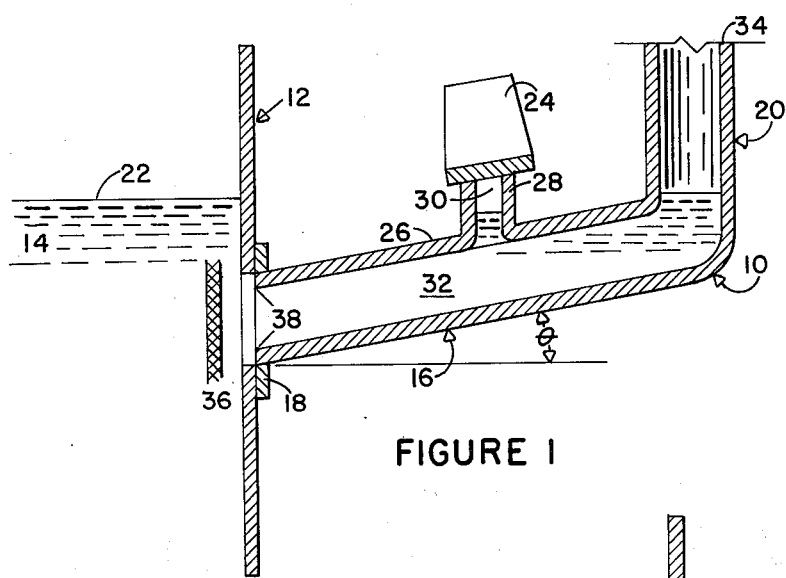
FIGURE 1
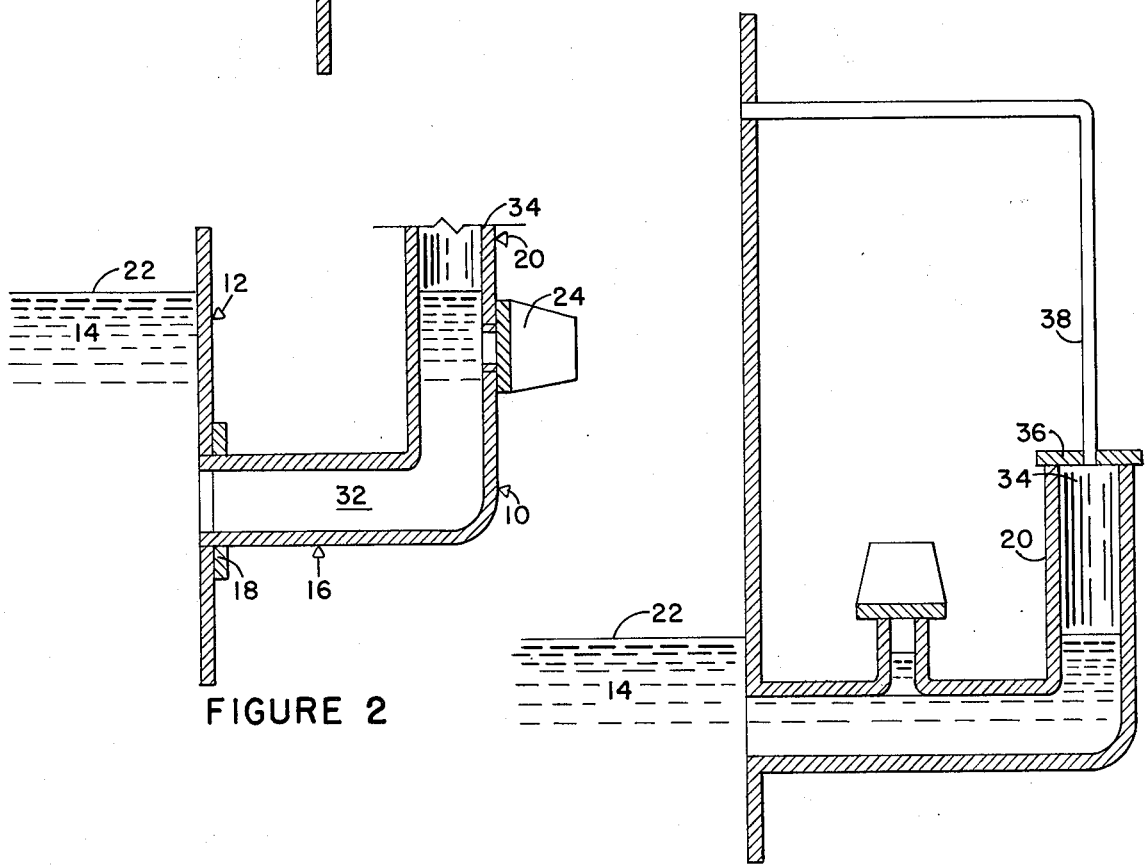
FIGURE 2
FIGURE 3

MOUNTING APPARATUS

This invention relates to mounting apparatus for positioning fluid level and pressure sensing means on fluid-containing vessels.

This invention further relates to a mounting apparatus for positioning pressure sensing means on fluid-containing vessels.

When vessels are used in the storage of fluids such as gases, liquids, solids, slurries and so on it is desirable that a method be available for determining the liquid level in such storage vessels and in many instances it is also desirable to determine the pressure inside such vessels. Many sensing devices are available for determining such liquid levels and pressures. In many instances wherein slurries are stored in liquid-containing vessels considerable difficulty is encountered in determining the liquid levels and the pressures inside such slurry-containing vessels. For instance the solids intend to impinge upon the sensing device thus introducing error into the determinations, it is normally necessary to agitate such slurry-filled vessels thus the solution is turbulent and the turbulence includes a further error in the determinations; the solids contained in the slurries tend to build up on and about the sensing apparatus thus introducing further errors and so on. In light of the fact that numerous instances are known wherein slurries are stored in slurry-containing vessels, it is highly desirable that a method be available for determining the liquid levels and the pressures inside such vessels.

It is an object of the present invention to provide a mounting apparatus for positioning a fluid level sensor on a fluid-containing vessel so that the liquid level and pressure inside the vessel are readily determined.

It is a further objective of the present invention to provide a mounting apparatus which allows the determination of liquid level and pressure inside slurry-containing vessels.

It has now been found that the foregoing and other objectives of the present invention are achieved by the use of a mounting apparatus comprising a tubular member positioned in fluid communication with a fluid-containing vessel; a standpipe means in fluid communication with the tubular member and a pressure damping means; and, a fluid level and pressure sensing means in fluid communication with the tubular member.

FIG. 1 is a cross sectional view of a preferred embodiment of the mounting apparatus of the present invention;

FIG. 2 shows a cross sectional view of a second embodiment of the mounting apparatus of the present invention; and, FIG. 3 is a cross sectional view of a further embodiment of the mounting apparatus of the present invention.

Similar numbers will be used for similar components throughout the description of the Figures.

With reference to FIG. 1, the mounting apparatus 10 of the present invention is shown positioned on a vessel 12 containing liquid 14. Mounting apparatus 10 comprises a tubular member 16 positioned in fluid communication with vessel 12 by a fitting 18. Tubular member 16 is also joined to a standpipe 20 which is formed as a part of tubular member 16. Standpipe 20 comprises an upwardly extending portion of tubular member 16 which is open to the atmosphere at an end 34 at a level above liquid level 22 in vessel 12. A fluid level and pressure sensing means 24 is positioned on an upper portion 26 of tubular member 16. In a preferred embodiment, fluid level and pressure sensing means 24 is positioned on a tubular section 28 joining it to upper portion 26 of tubular means 16. Desirably an air cushion 30 is positioned between liquid 32 positioned in tubular member 16 and fluid level and pressure sensing means 24.

In the operation of the present invention tubular member 16 is filled with liquid 32 during normal operation and as liquid level 22 rises the liquid in standpipe 20 also rises thereby creating a pressure gradient which is detected by fluid level and pressure sensing means 24. The fluid level in standpipe 20 and vessel 12 will be substantially the same when vessel 12 is at atmospheric pressure. Fluid level and pressure sensing means 24 is desirably connected to a level controller, pressure controller (not shown) and the like. It is desirable when slurries comprise the liquid in vessel 12 that tubular member 16 be installed at an angle $\theta$ which varies from about 0° to about 80°. Such installation results in a reduced tendency for solids to accumulate in tubular member 16. A further advantage is that in highly agitated vessels, standpipe 20 serves as a pressure damper thus minimizing pressure surges which are communicated to fluid level and pressure sensing means 24. Such surges tend to be further reduced by the presence of air cushion 30. Neither of these advantages is achieved when fluid level and pressure sensing means 24 is installed in direct communication with vessel 12 as by mounting on the side of vessel 12. It is clearly shown that standpipe 20 in combination with air cushion 30 and the positioning of fluid level and pressure sensing means 24 provides highly desirable and highly accurate pressure and fluid level measurements of fluid level 22 and the pressure inside vessel 12.

With reference to FIG. 2, mounting apparatus 10 is shown positioned on vessel 12 containing liquid 14 having a liquid level 22. Mounting apparatus 10 comprises tubular member 16 connected to vessel 12 by fitting 18. Fluid level and pressure sensing means 24 is positioned on standpipe 20 which is formed as a part of tubular member 16. Standpipe 20 is open to the atmosphere at end 34 at a level above liquid level 22 thereby providing a pressure-damping action. Tubular member 16 contains liquid 32 which is in direct contact with fluid level and pressure sensing means 24. Desirably fluid level and pressure sensing means 24 in FIG. 2 is positioned on a portion of standpipe 20 which is substantially perpendicular to the axis of propagation of potential shock waves generated by turbulence in vessel 12 and the like.

In the operation of the apparatus shown in FIG. 2 pressure measurements are determined directly from the liquid, but it is difficult for solids contained in liquid 14 in vessel 12 to enter tubular member 16 as far as liquid level and pressure sensing means 24. Pressure surges created by turbulence in vessel 12 and the like are relieved by the pressure damping effect of standpipe 20. Desirable determinations of the fluid levels and pressures inside vessel 12 are obtained, but the apparatus shown in FIG. 2 is somewhat more vulnerable to surges in pressure created by turbulence in vessel 12 and the like than is the apparatus shown in FIG. 1, since no air cushion is provided in the apparatus shown in FIG. 2. It is noted that it is not necessary to have an air cushion in the apparatus shown in FIG. 1 although the presence of such an air cushion is a desirable feature of the present invention.

Fluid level and pressure sensing means 24 can be any suitable fluid level and pressure sensing device known to those skilled in the art and desirable results have been obtained using a fluid level transmitter such as a series E 17 DL type manufactured by the Foxboro Corporation of Foxboro, Mass. Numerous such pressure and fluid level sensing devices are available to those skilled in the art and need not be discussed further since the primary novelty of the present invention lies in the particularly desirable mounting apparatus disclosed for positioning such sensing devices in sheltered positions so that accurate and reliable readings are obtained.

In a further embodiment of the present invention it may be found desirable in some instances to position a baffle 36 shown in FIG. 1 over the opening 38 of tubular member 16 into vessel 12. Such a baffle further reduces the tendency for solids to enter tubular member 16 and further minimizes pressure surges created by turbulence in vessel 12. The use of such baffles is preferred although it has been found that there is a tendency for solids to build up in and around such baffles thereby reducing the accuracy of the fluid level and pressure sensing means in some instances.

FIG. 3 shows a cross sectional view of an embodiment of the mounting apparatus useful with pressurized vessels. When vessel 12 is pressurized or under vacuum standpipe 20 is desirably closed by positioning a cap 36 on end 34. Cap 36 optionally is connected to a line 38 which is in fluid communication with vessel 12. Either arrangement is suitable although the latter arrangement is preferred since it allows the pressure in standpipe 20 and vessel 12 to be equalized.

It is pointed out that the foregoing description of preferred embodiments is illustrative rather than limiting in nature and that many variations and modifications are possible within the scope of the present invention.

Having thus described the invention, I claim:

1. A mounting apparatus for positioning a liquid level sensor on a liquid-containing vessel to determine liquid levels accurately, said liquids optionally containing particulate material, wherein said mounting device comprises:
   a. tubular member positioned in fluid communication with said liquid-containing vessel;
   b. a standpipe and a pressure damping means in fluid communication with said tubular member; and,
   c. means for mounting a fluid level and pressure sensing means in fluid communication with said tubular member.

2. The apparatus of claim 1 wherein said liquid is a slurry.

3. The apparatus of claim 2 wherein said tubular member joins said vessel at an angle from about 0° to about 80° and below the surface of said liquid.

4. The apparatus of claim 3 wherein said fluid level and pressure sensing means is positioned on an upper portion of said tubular member between said vessel and said standpipe means.

5. The apparatus of claim 4 wherein said standpipe means comprises an upwardly extending portion of said tubular member which is open to the atmosphere at a level above the liquid level in said vessel.

6. The apparatus of claim 5 wherein said fluid level and pressure sensing means is positioned on a tubular member joining said sensing means to said upper portion of said tubular member.

7. The apparatus of claim 6 wherein said tubular member contains liquid and an air cushion is positioned between said liquid in said tubular member and said fluid level and pressure sensing means.

8. The apparatus of claim 1 wherein said fluid level and pressure sensing means is positioned on said standpipe.

* * * * *